UNITED STATES PATENT OFFICE.

THEOPHIL PFISTER, OF CHICAGO, ILLINOIS.

MANUFACTURE OF TILES, BRICKS, PANELS, &c.

SPECIFICATION forming part of Letters Patent No. 718,381, dated January 13, 1903.

Application filed June 24, 1899. Serial No. 721,679. (No specimens.)

*To all whom it may concern:*

Be it known that I, THEOPHIL PFISTER, a citizen of the United States, residing at Chicago, in the county of Cook and State of Illinois, have invented an Improvement in the Manufacture of Tiles, Bricks, Panels, &c., of which the following is a specification.

My invention relates to the method of manufacturing tiles, bricks, and panels in transparent cloisonné or mosaics.

In carrying out my invention and in the process of manufacture I employ a suitable mold of about the size of the tile, brick, or panel to be made, and in the bottom of the mold I place a layer of globules or particles of glass, which are adapted to form the face of the tile, brick, or panel and which particles may be from waste glass. I then fill substantially the balance of the mold with glass in a molten state, which fills the interstices between the globules or glass particles to the bottom of the mold. On top of the glass while in a molten state I then place another layer or backing of coarse granular glass. The material thus employed for forming the tile, brick, or panel is consolidated under pressure and annealed and fire-polished, if necessary. I may place a layer of transparent glass in a molten state in the bottom of a mold and then place cloisonné-work on the top of the transparent molten glass and thereafter fill up the mold with glass in a molten state, which is pressed and thereafter polished.

In Letters Patent No. 639,862 for ornamental cloisonné ware, granted to me December 26, 1899, a cloisonné strip is described as composed of metallic beads strung on a wire, and in connection with the present invention such a cloisonné strip may be employed, the same being bent to a suitable design and laid upon the bottom of the mold, the glass globules or particles being laid around the same, the molten glass being then poured to substantially fill the mold and the backing of coarse granular glass employed, and the same pressed or the surface finished, as hereinbefore described. The use of such a cloisonné strip in the tile, brick, or panel will impart to the same an ornamental character.

I claim as my invention—

1. The method of making tiles, bricks or panels, in mosaics consisting in making a layer of globules or glass particles to form the face of the tile, brick or panel, adding thereto glass in a molten state to cover the said globules or particles and to fill the interstices between the same to a suitable depth, then adding coarse granular glass to the hot glass as a backing to the desired thickness and afterward subjecting the mass to pressure to consolidate the particles and impart a finish to the surface, substantially as specified.

2. As a new article of manufacture, a tile, brick or panel in transparent mosaics, comprising a body of transparent glass containing a layer of globules or glass particles adjacent to one surface and a layer or backing of coarse granular glass adjacent to the other surface and said materials bound together by said body of transparent glass which fills the interstices thereof, substantially as specified.

Signed by me this 14th day of June, 1899.

THEOPHIL PFISTER.

Witnesses:
WALTER J. SKERTEN,
T. J. OSMAN.